United States Patent [19]

Inaba et al.

[11] Patent Number: 5,471,251
[45] Date of Patent: Nov. 28, 1995

[54] VIDEO DISPLAYING APPARATUS CAPABLE OF DISPLAYING A VIDEO WHILE FORMING A BLANKING REGION

[75] Inventors: Hitoshi Inaba; Hidenobu Kimura, both of Saitama, Japan

[73] Assignee: Kabushiki Kaisha Toshiba, Kaewasaki, Japan

[21] Appl. No.: 74,441

[22] Filed: Jun. 10, 1993

[30] Foreign Application Priority Data

Jun. 15, 1992 [JP] Japan ................................ 4-154925

[51] Int. Cl.$^6$ ........................ H04N 5/265; H04N 5/262
[52] U.S. Cl. ................................... 348/634; 348/637
[58] Field of Search .................. 358/165, 33, 181–183; 348/633, 634, 637; H04N 5/46, 7/01, 5/265, 5/262

[56] References Cited

U.S. PATENT DOCUMENTS

| | | | |
|---|---|---|---|
| 3,707,597 | 12/1972 | Lunn | 358/165 |
| 3,821,468 | 6/1974 | Busch | 358/183 |
| 4,021,849 | 5/1977 | Wheeler | 358/165 |
| 4,330,792 | 5/1992 | Naimpally | 358/33 |
| 4,356,511 | 10/1992 | Tsujimura | 358/181 |

FOREIGN PATENT DOCUMENTS

| | | | |
|---|---|---|---|
| 141865 | 6/1987 | Japan | H04N 5/265 |
| 63-26174 | 2/1988 | Japan . | |
| 2221119 | 1/1990 | United Kingdom . | |
| 2262409 | 6/1993 | United Kingdom . | |

*Primary Examiner*—James J. Groody
*Assistant Examiner*—Glenton B. Burgess
*Attorney, Agent, or Firm*—Cushman, Darby & Cushman

[57] ABSTRACT

A television receiver has a video muting processing function wherein a blanking added video signal is produced by superimposing on a video signal a blanking signal gradually varying in the width in the time direction and consists of a composite signal in which blanking signals are superimposed respectively on the front edge and rear edge of the video signal part.

3 Claims, 5 Drawing Sheets 8a  8b  8a

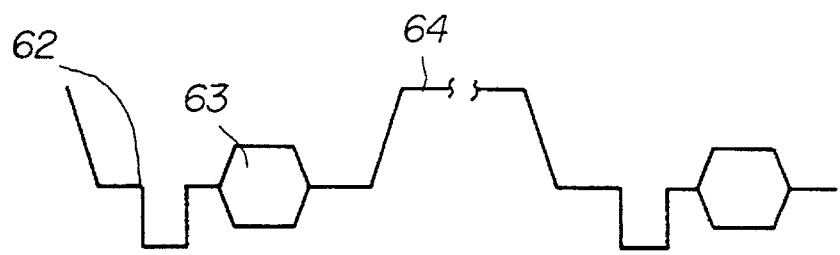
FIG. 6A
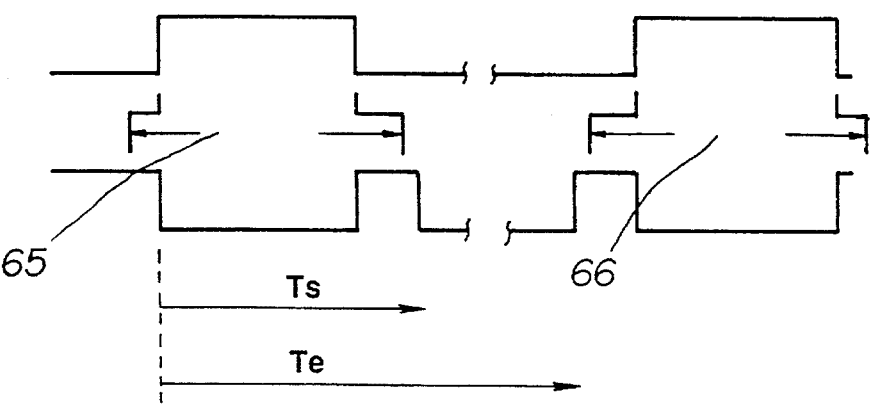
FIG. 6B
FIG. 6C
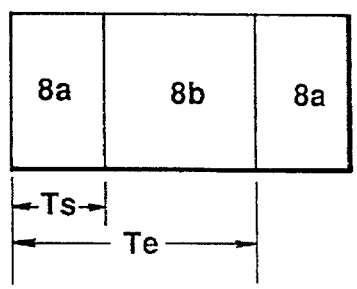
FIG. 6D

VIDEO DISPLAYING APPARATUS CAPABLE OF DISPLAYING A VIDEO WHILE FORMING A BLANKING REGION

BACKGROUND OF THE INVENTION

1. Field of the Invention

This invention relates to a video displaying apparatus having a video muting processing function by which a video is apparently erased from a screen of a picture tube.

2. Description of the Related Art

Generally, in a television receiver, a video is displayed on a screen of a picture tube. When the video will be disturbed by a noise generated due to switching of the channel, the video is erased. Also, in order to erase the video from the screen when an independent sound broadcast is heard such as a satellite broadcast, the entire screen is displayed in black to erase the video from the screen. The video muting process is thus made.

A television receiver having such video muting processing function comprises a driving mechanism for feeding a video signal to a picture tube and driving the picture tube, and a blanking mechanism for feeding a blanking signal instead of the video signal fed to the picture tube when a video muting process is indicated. In such television receiver, when the video muting process is performed, the displaying screen on which the video is displayed will be temporarily switched over to a black background image. Therefore the brightness of the displaying screen will quickly vary and the driving mechanism will be subjected to a large load. Also, the quick variation of the displaying screen at the time of this video muting process will give an uneasy feeling to the utilizer.

As described above, in the conventional television receiver, at the time of the video muting process, a large load will be applied to the driving mechanism for displaying the screen and a visual unease will be given to the utilizer by the quick variation of the displaying screen.

OBJECTS AND SUMMARY OF THE INVENTION

An object of the present invention is to provide a video displaying apparatus wherein, at the time of the video muting process, the load applied to the driving means for the displaying screen can be made small and and the utilizer can be prevented from being subjected to a visual uneasy feeling by the abrupt variation of the displaying screen.

Another object of the present invention is to provide a video displaying apparatus wherein the aspect ratio of the screen can be apparently varied by adjusting the width of the blanking region at the time of the video muting process.

The present invention is a video displaying apparatus wherein a video can be displayed while forming a blanking region adjacent to a video displaying region, comprising a video signal source and a means of superimposing on said video signal a blanking signal gradually varying in the width of said blanking region.

In the video displaying apparatus of the present invention, a blanking signal gradually varying in the width is superimposed on the video signal. As the width in the time direction of the blanking signal gradually varies with the lapse of time, the video displaying region will not quickly vary.

The aspect ratio of the screen can be apparently varied by adjusting the variation width in the time direction of the blanking signal.

The above and further objects and novel features of the invention will more fully appear from the following detailed description when the same is read in connection with the accompanying drawings. It is to be expressly understood however that the drawings are for the purpose of illustration only and are not intended as a definition of the limits of the invention.

BRIEF DESCRIPTION OF THE DRAWING

FIGS. 6A–6D provide views showing a video signal, horizontal blank signal, blanking signal and the widths Ts and Te in the time direction of a blanking region defined by the blanking signal.

DETAILED DESCRIPTION OF PREFERRED EMBODIMENTS

The embodiments of the present invention shall be explained in the following with reference to the drawings.

Figure 1:
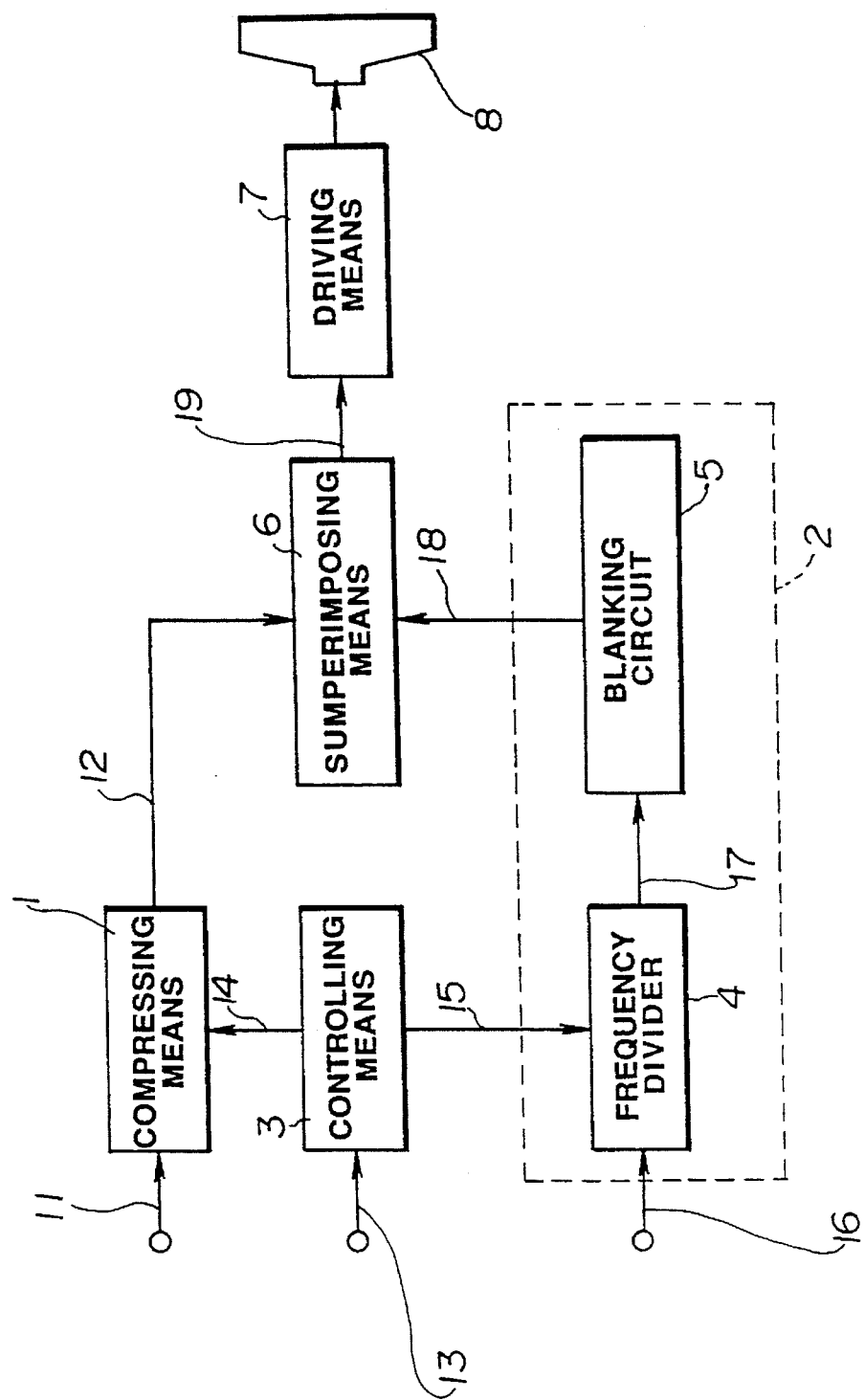
FIG. 1 is a block diagram showing an embodiment of a television receiver which is of a video displaying apparatus of the present invention.

FIG. 1 is a block diagram showing an embodiment of a television receiver which is of a video displaying apparatus of the present invention.

As shown in FIG. 1, a television receiver having a video muting processing function comprises a compressing means 1 compressing a video signal in the time axis as required, a blanking signal generating means 2 generating a blanking signal 18 varying in the width in the time direction gradually against the video signal 11, a controlling means 3 indicating a video muting process and the like, a superimposing means 6 for superimposing the video signal 12 from the compressing means 1 and the blanking signal 18 on each other and a driving means 7 for feeding the output signal 19 from this superimposing means 6 to a picture tube 8.

The operation of the compressing means 1 and the operation of the blanking signal generating means 2 a controlled by the controlling means 3 which generates a compression rate indicating signal 14 for compressing the video signal in the horizontal time direction as required on the basis of a video mute indicating signal 13 from outside and produces a frequency dividing ratio setting signal 15.

The frequency dividing ratio shown by the frequency dividing ratio setting signal 15 varies gradually with the lapse of time and its varying range is determined by the aspect ratio of the video displayed on the screen.

The frequency dividing ratio setting signal 15 is given to the frequency divider 4 which divides the frequency of an input clock signal 16 on the basis of that frequency dividing ratio and outputs a frequency dividing signal 17 varying in response to the frequency dividing ratio.

The frequency dividing signal 17 is given to a blanking circuit 5 which generates the blanking signal 18 on the basis of the frequency dividing signal 17 from the frequency divider 4 and the width in the time direction of the blanking signal 18 is gradually varied in response to the frequency of the frequency dividing signal 17. A blanking circuit 5 forms the blanking signal generating means 2 in cooperation with the frequency divider 4.

The blanking signal 18 is given to the superimposing means 6 together with the video signal 12 from the compressing means 1. By adding, such a blanking video signal 19, makes, for example, the central part a video signal region and forms blanking regions on the right and left of the video signal region. That is to say, the blanking added video signal 19 is a composite signal in which the blanking signals 18 are superimposed respectively on the front edge and rear edge of the video part of the video signal 12.

The blanking added video signal 19 produced by the superimposing means 6 is given to the driving means 7 which processes the video corresponding to the blanking added video signal 19 so as to be displayed on the screen of the picture tube 8. The aspect ratio (m:n) of the screen of the picture tube 8 is, for example, 9:16.

Figure 2:
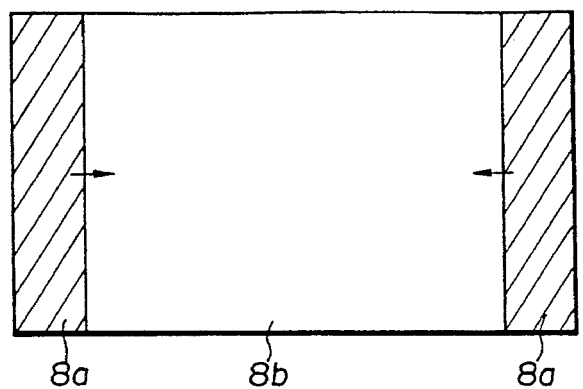
FIG. 2 is a view showing an example of a screen state to which a video muting process of the television receiver in FIG. 1 is applied.
Figure 3:
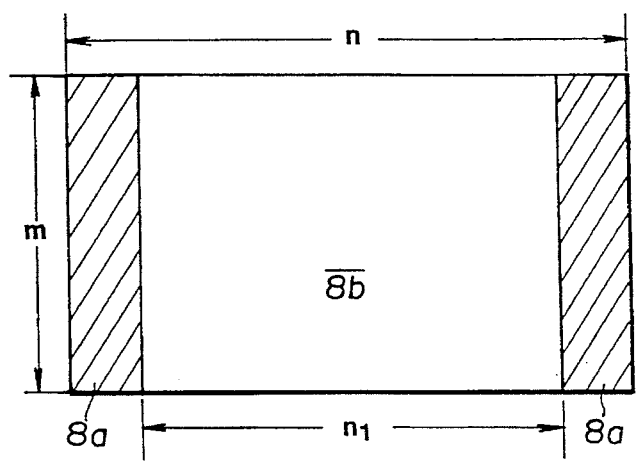
FIG. 3 is a view showing another example of a screen state to which a video muting process of the television receiver in FIG. 1 is applied.

The video muting process of the television receiver in FIG. 1 shall be explained in the following with reference to the drawings. FIG. 2 is a view showing an example of a screen state to which a video muting process is applied. FIG. 3 is a view showing another example of a screen state to which a video muting process is applied.

In the first video muting mode, when an independent sound broadcast provided by a satellite broadcast or the like is heard, a video mute will be applied to the entire screen. When an operation of indicating the above described first video muting mode is made by the utilizer, a video mute indicating signal will be given to the controlling means 3 which produces the compression rate indicating signal 14 and frequency dividing ratio setting signal 15 on the basis of the video mute indicating signal 13. In this first video muting mode, the compression rate shown by the compression rate indicating signal 14 is 1 and no time compression is made.

The frequency dividing ratio setting signal 15 is given to the frequency divider 4 which divides the frequency of the input clock signal 16 but the frequency dividing ratio gradually varies. The thus obtained frequency dividing signal 17 is output.

The frequency dividing signal 17 is given to the blanking circuit 5 which generates a blanking signal 18 on the basis of the frequency dividing signal 17 and the width in the time direction of the blanking signal 18 is varied on the basis of the frequency of the frequency dividing signal 17.

The blanking signal 18 is given to the superimposing means 6 together with the video signal 12 from the compressing means 1. By the superimposing means 6, the blanking added video signal 19 in which the blanking signals 18 are superimposed respectively on the front edge and rear edge of the video signal part is produced by superimposing the video signal 12 on the blanking signal 18.

The blanking added video signal 19 produced by the superimposing means 6 is given to the driving means 7 to be processed. Thus, as shown in FIG. 2, the video corresponding to the blanking added video signal 19 is displayed on the screen of the picture tube 8, the blanking regions 8a expand toward the center from both sides in the horizontal direction of the screen gradually with the lapse of time and the video region 8b gradually narrows with the expansion of the blanking regions 8a. After the lapse of a predetermined time, the entire screen of the picture tube 8 will become a blanking region and a black background image will be displayed.

Therefore, at the time of the video muting process, the video on the screen of the picture tube 8 will be slowly switched over to a black background image from the ordinary video and a video mute will be applied as if a curtain were closed. As a result, an uneasy feeling caused to the utilizer by abruptly switching over the picture surface can be prevented. When the screen is slowly switched in the video muting process, the brightness of the screen of the picture tube 8 will not be quickly varied and the load applied to the driving means 7 will be able to be prevented from rising.

When the utilizer switches the high vision broadcast program over to the ordinary broadcast program (for example, the NTSC broadcast), the aspect ratio of the displayed video will vary from 9:16 to 3:4. The second video muting mode is a video muting process made with the variation of the aspect ratio of the screen in such case. In this second video muting mode, the controlling means 3 receives a video mute indicating signal 13 and gives the frequency divider 4 a frequency dividing ratio setting signal 15 for gradually varying the blanking width. At this time, by the blanking signal 18 from the blanking circuit 5, as shown in FIG. 3, blanking regions 8a gradually expands toward the center from the right and left ends of the screen of the picture tube 8 but the expansion will be stopped when the screen region of 3:4 is reached.

On the other hand, the video signal 11 is compressed in the horizontal time direction by the compression rate indicating signal 14 and a video signal having an aspect ratio of 3:4 is output from the compressing means 1. Thus, a video region 8b having an aspect ratio (m:n1) of 3:4 in the central part is produced on the screen and blanking regions 8a are produced on both sides of it.

Figure 4:
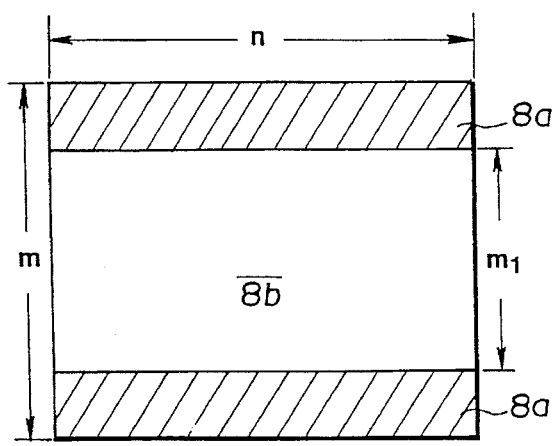
FIG. 4 is a view showing an example of a screen state to which a video muting process is applied in another embodiment of a television receiver which is of a video displaying apparatus of the present invention.

By the way, in the above embodiment, the screen display is described on the picture tube of an aspect ratio of 9:16. However, even when displaying a video of 9:16 in a picture tube of an aspect ratio of 3:4, the same principle is applied. That is to say, as shown in FIG. 4, in the case of displaying the video of 9:16 in the picture tube of the aspect ratio of 3:4, a video muting process forming a screen consisting of a video region 8b and blanking regions 8a, positioned respectively above and below video region 8b, will be able to be realized by superimposing blanking signals of vertical scanning periods on vacant region parts above and below a compressed video signal obtained by time compressing the video signal in the vertical scanning direction. Using this video muting process, the aspect ratio of the video displayed on the screen varies from 3:4(m:n) to 9:16 (m1:n) but the widths of the blanking regions 8a, above and below, may gradually expand toward the center side. By the way, a process of thinning the signals of a predetermined number of lines is necessary for generating the compressed video signals used in this muting process.

Figure 5:
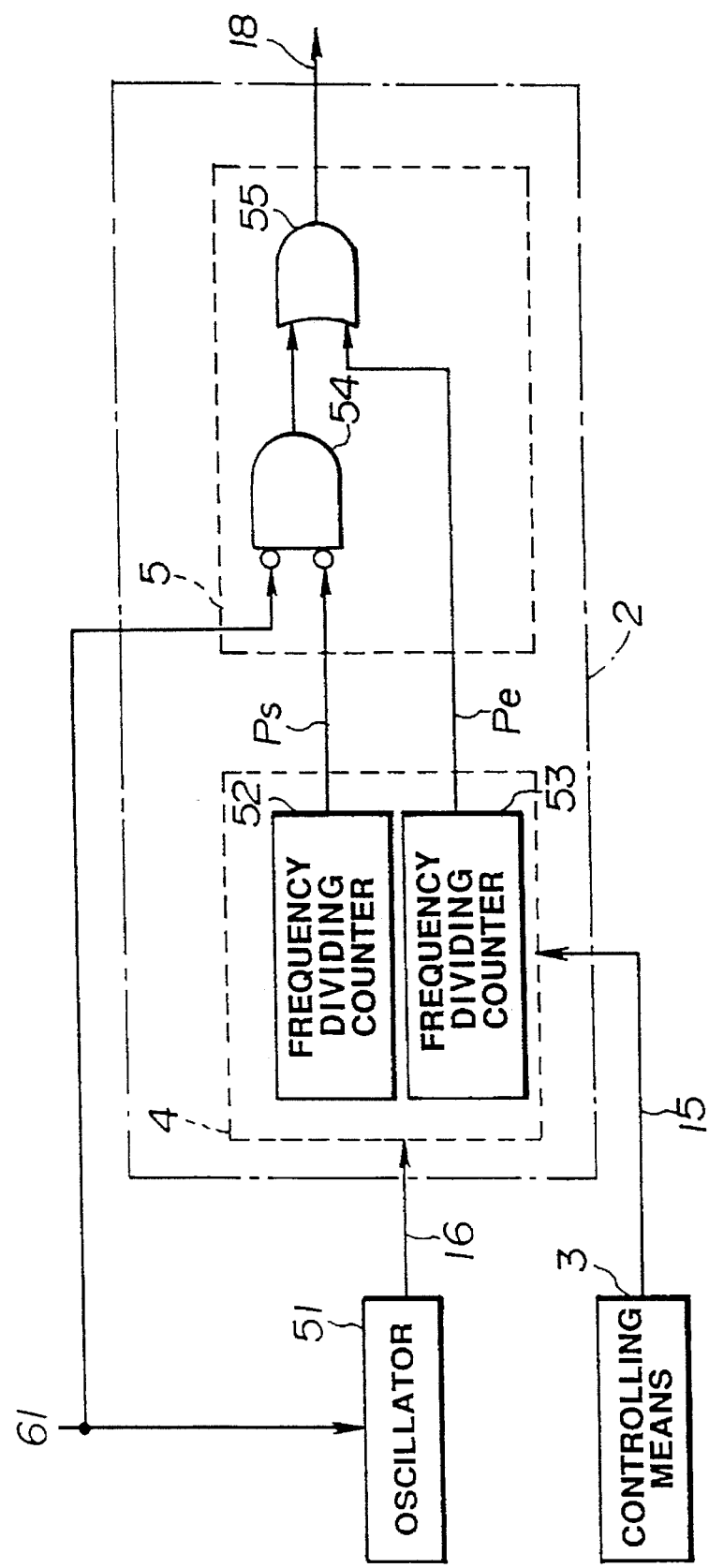
FIG. 5 is a block diagram showing an example of a blanking signal generating means used in the video displaying apparatus in FIG. 1.

An example of the blanking signal generating means 2 shall be explained in the following with reference to the drawings. FIG. 5 is a block diagram showing an example of a blanking signal generating means used in the video displaying apparatus in FIG. 1. FIG. 6A is a view showing a video signal, FIG. 6B is a horizontal blank signal, FIG. 6C is a blanking signal, and FIG. 6D the widths Ts and Te in the time direction of a blanking region defined by the blanking signal of FIG. 6C.

As shown in FIG. 5, the blanking signal generating means 2 has the frequency divider 4 taking in the clock signal 16 from the oscillator 51 and the frequency dividing ratio setting signal 15 from the controlling means 3. The oscillator 51 makes the horizontal blank signal 61 a trigger signal and oscillates the clock signal 16 during the blanking period indicated by the horizontal blank signal of FIG. 6B. The horizontal blank signal 61 is produced on the basis of the fall of the horizontal synchronizing signal 62 included in the video signal of FIG. 6A and its width is set to be of a predetermined value so as not to exceed the horizontal flyback time. Burst signal 63 and video portion 64 are also depicted in FIG. 6A, while two periods of no compressing video signals are shown as 65 and 66 in FIG. 6C.

The frequency divider 4 includes two frequency dividing counters 52 and 53. A constant A for determining the left blanking width in the horizontal direction is given together with the clock signal 16 from the oscillator 51 to one frequency dividing counter 52 and a constant B for determining the right blanking width in the horizontal direction is given together with the clock signal 16 from the oscillator 51 to the other frequency dividing counter 53. The constants A and B are included in the frequency dividing ratio setting signal 15.

The frequency dividing counter 52 produces a counted value for determining the left end of the video displaying region on the basis of the constant A and a pulse Ps is produced on the basis of this counted value. On the other hand, the frequency dividing counter 53 produces a counted value for determining the right end of the video displaying region on the basis of the constant B and a pulse Pe is produced from this counted value.

The pulse Pe is given together with the horizontal blank signal 61 to a NAND circuit 54 which takes a logical product of the pulse Pe and horizontal blanking signal 61. The output signal from the NAND circuit 54 is given together with the pulse Pe to an OR circuit 55 which takes a logical sum of the output signal and pulse Pe. From the OR circuit 55, as shown in FIG. 6C, there is output a blanking signal defining a time direction width Ts (s=1 to n) from the left end of the screen to the boundary between the left side blanking region 8a and the video region 8b and a time direction width Te (e=1 to n) from the left end of the screen to the boundary between the video region 8b and the right side blanking region 8a.

Figure 7:
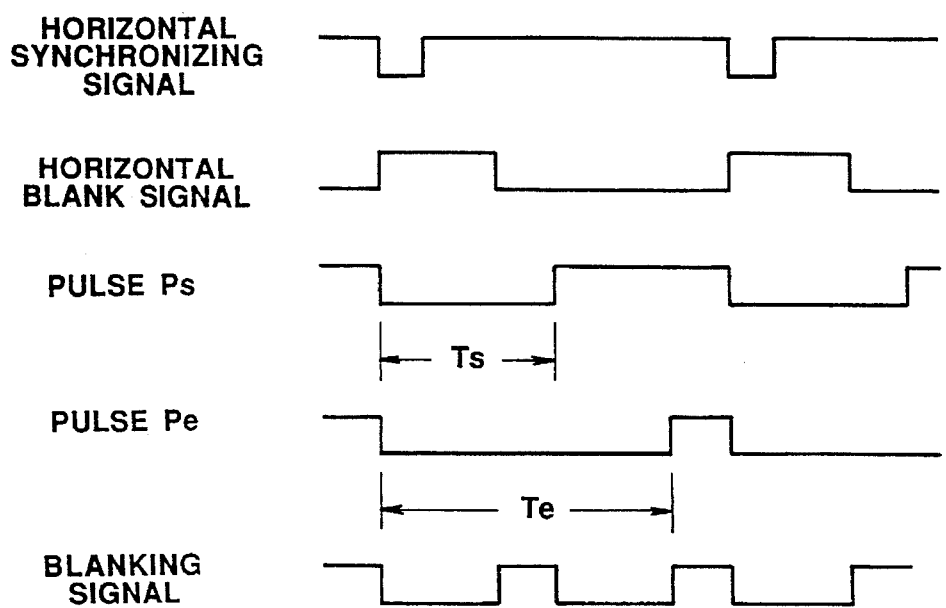
FIG. 7 shows time charts of respective signals used in the operation explanation of the blanking signal generating means in FIG. 5.
Figure 8:
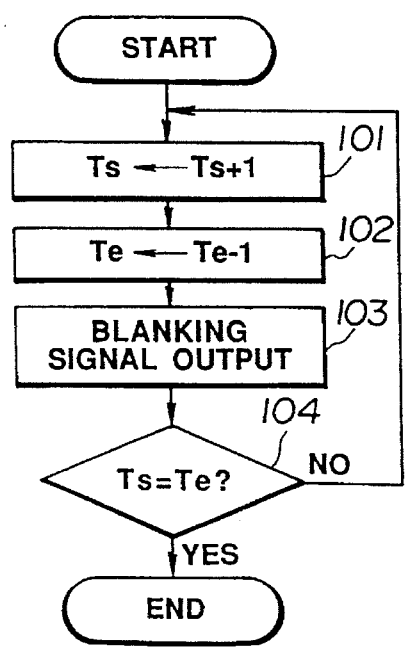
FIG. 8 is a flow chart for explaining the operation of the blanking signal generating means in FIG. 5.

The operation of the above described blanking signal generating means 2 shall be explained in the following with reference to the drawings. FIG. 7 shows time charts of respective signals used in the operation explanation of the blanking signal generating means in FIG. 5. FIG. 8 is a flow chart for explaining the operation of the blanking signal generating means in FIG. 5.

For example, when the video muting process is carried out while forming blanking regions on the right and left parts of the picture surface, as shown in FIG. 7, first the horizontal blank signal 61 will be input into the oscillator 51 which will make the horizontal blank signal 61 a trigger signal and will oscillate a clock signal 16 during the blanking period shown by this horizontal blank signal 61.

The clock signal 16 from the oscillator 51 will be given together with the frequency dividing ratio setting signal 15 from the controlling means 3 to the frequency divider 4 and the frequency dividing counters 52 and 53 will operate to count the clock signal 16 on the basis of the constants A and B included in the frequency dividing ratio setting signal 15 and will produce pulses Ps and Pe.

The pulse Pe will have the logical product with the horizontal blank signal 61 taken in the NAND circuit 54, the output signal from the NAND circuit 54 will have the logical sum with the pulse Pe taken in the OR circuit 55 and a blanking signal 18 defining the above described time direction width Ts (s=1 to n) and time direction width Te (e=1 to n) will be produced.

The flow in the case of applying a video mute to the entire screen shall be explained in the following with reference to the FIG. 8. The time direction width Ts and time direction width Te are gradually renewed (in the steps 101 and 102) and, whenever they are renewed, the blanking signal 18 will be output (in the step 103).

Then, the time direction width Ts and time direction width Te are compared with each other (in the step 104). When the time direction width Ts and the time direction width Te do not coincide with each other, the above described steps 101 to 104 will be repeated. When the time direction width Ts and the time direction width Te coincide with each other, a black background image will be displayed on the entire screen of the picture tube 8 and the video muting process will end.

As explained above, according to the video displaying apparatus of the present invention, at the time of a video muting process, the load applied to the driving means controlling the screen display will be able to be made small and the visually uneasy feeling caused to the utilizer by the abrupt variation of the displaying screen will be able to be prevented.

Also, the aspect ratio of the screen can be apparently varied by adjusting the blanking region forming region.

By the way, the example of gradually expanding the width of the blanking region when the video mute is applied is described in the above explanation. However, if the width of the blanking region is gradually narrowed when the video mute is released, such visual effect as if a curtain were opened will be able to be obtained.

As many apparently widely different embodiments of this invention may be made without departing from the spirit and scope thereof, it is to be understood that the invention is not limited to the specific embodiments thereof except as defined in the appended claims.

What is claimed is:

1. A video displaying apparatus capable of displaying a video while forming a blanking region adjacent to the video displaying region, said video displaying apparatus comprising:

a video signal source for providing a video signal;

compressing means for compressing said video signal in a predetermined time direction, thereby converting said video signal to a compressed signal;

blanking signal generating means for generating a blanking signal gradually varying relative to a width of said blanking region;

superimposing means for superimposing said blanking signal on a vacant region produced by compressing said video signal, thereby producing a blanking added video signal; and driving means for displaying a video corresponding to said blanking added video signal produced by said superimposing means.

2. A video displaying apparatus capable of displaying a video while forming a blanking region adjacent to the video displaying region, said video displaying apparatus comprising:

- a video signal source for receiving and processing a television broadcast signal and for producing a video signal based on said processed television broadcast signal;
- signal generating means for generating a blanking signal which gradually increases in blanking width toward a picture center from at least one of the horizontal and vertical directions, said blanking signal being generated in response to a video mute;
- superimposing means for superimposing said blanking signal on said video signal produced by said video signal source; and
- means for displaying an image corresponding to said video signal to which said blanking signal output from said signal generating means is superimposed.

3. A video displaying apparatus capable of displaying a video while forming a blanking region adjacent to the video displaying region, said video displaying apparatus comprising:

- a video signal source for receiving and processing a television broadcast signal and for producing a video signal based on said processed television broadcast signal;
- means for indicating a release of a video mute;
- signal generating means for generating a blanking signal which gradually decreases in blanking width toward at least one of horizontal and vertical directions relative to a central region within said video displaying region, said blanking signal being generated in response to said indication of video mute release;
- superimposing means for superimposing said blanking signal from said signal generating means on said video signal from said video signal source; and
- displaying means for displaying an image corresponding to said video signal to which said blanking signal output from said signal generating means is superimposed.

* * * * *